US008833990B2

(12) United States Patent
Tessnow et al.

(10) Patent No.: US 8,833,990 B2
(45) Date of Patent: Sep. 16, 2014

(54) AUTOMOTIVE LAMP AND SOCKET APPARATUS WITH PIGTAIL CONNECTOR

(75) Inventors: Thomas Tessnow, Weare, NH (US); Ronald Boyd, Chichester, NH (US); Lawrence M. Rice, Hillsboro, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 49 days.

(21) Appl. No.: 13/551,668

(22) Filed: Jul. 18, 2012

(65) Prior Publication Data

US 2014/0022782 A1 Jan. 23, 2014

(51) Int. Cl.

| | |
|---|---|
| ***B60Q 1/00*** | (2006.01) |
| ***B60Q 3/00*** | (2006.01) |
| ***B60Q 11/00*** | (2006.01) |
| ***B60Q 3/04*** | (2006.01) |
| ***F21S 8/10*** | (2006.01) |
| ***F21V 11/00*** | (2006.01) |
| ***F21V 21/00*** | (2006.01) |
| ***F21V 29/00*** | (2006.01) |
| ***F21V 15/01*** | (2006.01) |
| ***F21V 7/20*** | (2006.01) |
| ***H01R 33/00*** | (2006.01) |
| ***F21V 7/00*** | (2006.01) |
| ***F21S 4/00*** | (2006.01) |
| ***H01B 17/26*** | (2006.01) |
| ***H01B 17/58*** | (2006.01) |
| ***H02G 3/22*** | (2006.01) |

(52) U.S. Cl.

USPC ........... 362/507; 362/543; 362/544; 362/545; 362/546; 362/547; 362/345; 362/294; 362/647; 362/350; 362/249.02; 362/249.11; 362/368; 174/153 G

(58) Field of Classification Search

CPC . B60R 16/0222; B60Q 1/2696; F21S 48/212; F21S 48/215; F21S 48/328; F21S 8/086; F21V 29/004; F21V 19/001

USPC ......... 362/373, 507, 543, 544, 545, 546, 547, 362/345, 294, 218, 264, 647, 369, 350, 368, 362/418, 429–430, 217.07, 217.12, 217.13, 362/249.02, 249.11; 174/152 R, 153 R, 174/153 G

See application file for complete search history.

(56) References Cited

U.S. PATENT DOCUMENTS

| | | | | |
|---|---|---|---|---|
| 3,067,974 | A * | 12/1962 | Baldwin | 248/27.1 |
| 5,160,200 | A | 11/1992 | Cheselske | |
| 6,371,636 | B1 | 4/2002 | Wesson | |
| 6,682,211 | B2 * | 1/2004 | English et al. | 362/545 |
| 6,773,138 | B2 | 8/2004 | Coushaine | |

(Continued)

*Primary Examiner* — Ismael Negron
*Assistant Examiner* — William N Harris
(74) *Attorney, Agent, or Firm* — Edward S. Podszus

(57) ABSTRACT

A lamp apparatus (14) includes a heat sink (28), a heat conductive post (26) having a plurality of faces (36), one or more light engines (30) coupled to each of a plurality of faces (36), a connector (32) to provide power to the light engine (30) when electrically coupled to a lamp socket, and a grommet (34). The grommet (34) is secured to and extends around a perimeter of the heat conductive post (26) and includes a radial groove (48) receiving a rim (21) of an opening (20) of a reflector (12) such that a first and a second portion (50, 51) of the grommet (34) extend beyond the rim (21) and over a portion of an interior and an exterior surface (23, 25) of the reflector (12) to secure the lamp apparatus (14) to the opening (20) of the reflector (12).

19 Claims, 10 Drawing Sheets

(56) References Cited

U.S. PATENT DOCUMENTS

| | | | | |
|---|---|---|---|---|
| 6,786,625 | B2 | 9/2004 | Wesson | |
| 7,008,096 | B1 | 3/2006 | Coushaine et al. | |
| 7,111,972 | B2 | 9/2006 | Coushaine et al. | |
| 7,153,008 | B2 | 12/2006 | Grote, III et al. | |
| 7,207,695 | B2 | 4/2007 | Coushaine et al. | |
| 7,261,437 | B2 | 8/2007 | Coushaine et al. | |
| 7,261,451 | B2 | 8/2007 | Coushaine et al. | |
| 7,290,910 | B1 | 11/2007 | Hohl-AbiChedid et al. | |
| 7,407,304 | B2 | 8/2008 | Tasson et al. | |
| 7,661,854 | B1 * | 2/2010 | Yang et al. | 362/373 |
| 7,703,949 | B2 * | 4/2010 | Lai | 362/294 |
| 8,646,957 | B2 * | 2/2014 | Johnson et al. | 362/545 |
| 2003/0227774 | A1 | 12/2003 | Martin et al. | |
| 2013/0100672 | A1 * | 4/2013 | Park | 362/249.02 |
| 2013/0343048 | A1 * | 12/2013 | Dumont | 362/217.07 |
| 2014/0092609 | A1 * | 4/2014 | Moshtagh | 362/373 |

* cited by examiner

AUTOMOTIVE LAMP AND SOCKET APPARATUS WITH PIGTAIL CONNECTOR

TECHNICAL FIELD

The present disclosure relates to illumination systems, and more particularly pertains to light emitting diode (LED) based signaling systems and apparatus that are retrofits for OEM original equipment incandescent lamps in vehicle RCL (rear combination lamp) assemblies.

BACKGROUND

In the past, automotive light sources chiefly used incandescent bulbs. While working well and being inexpensive, these bulbs have a relatively short life and, of course, the thin filament employed was subject to breakage due to vibration.

Light emitting diodes (LEDs) have been proposed for lamps and automotive applications. These solid-state light sources have long lives and are not as subject to vibration failures. In order to replace an incandescent bulb with an LED light source, the LED light sources should function the same in the existing lamp assemblies and optics. For example, the LED light sources should have approximately the same light output and cannot exceed the electrical power consumption. In some applications, the lighting system (e.g., a turn signal) may require a minimum power consumption in order to work properly. Some flashers used with turn signals may require a minimum current in order to have the correct flash rate. If the current is below the threshold (e.g., in many LED based light sources), the flash rate goes up as if the bulb was burned out. The extra load may cause a significantly higher thermal load, and while LEDs may generate less heat compared to incandescent light bulbs, LEDs nevertheless do generate heat whose dissipation should be managed in order to control the junction temperature. A higher junction temperature generally correlates to lower light output and lower luminaire efficiency. Unfortunately, it may be difficult to dissipate thermal energy in many applications due to space constraints, for example, within the constraints of many lamp assemblies. Proposals for LEDs in automotive applications include those in U.S. Pat. No. 7,290,910 (Hohl-AbiChedid); U.S. Pat. No. 7,261,437 (Coushaine); U.S. Pat. No. 7,207,695 (Coushaine); U.S. Pat. No. 7,111,972 (Coushaine); U.S. Pat. No. 6,773,138 (Coushaine); U.S. Pat. No. 7,261,451 (Coushaine); U.S. Pat. No. 7,008,096 (Coushaine); and U.S. Pat. No. 6,682,211 (English). The following are also known: U.S. Pat. No. 5,160,200 (Cheselske); U.S. Pat. No. 6,371,636 (Wesson); U.S. Pat. No. 6,786,625 (Wesson); U.S. Pat. No. 7,407,304 (Tasson); and Pat. Pub. US 2003/0227774 (Martin).

BRIEF DESCRIPTION OF THE DRAWINGS

Features and advantage of the claimed subject matter will be apparent from the following description of embodiments consistent therewith, which description should be considered in conjunction with the accompanying drawings, wherein:

DETAILED DESCRIPTION

By way of an overview, one aspect consistent with the present disclosure may feature an apparatus, system, and method for retrofitting an existing S8 wedge bulb reflector with a lamp apparatus having light emitting diodes (LEDs). The lamp apparatus includes a heat conductive post extending outwardly from a heat sink, LEDs mounted on the faces of the post, a grommet, and an electrical connector (e.g., an S8 wedge connector) configured to provide power to the LEDs. The grommet includes an opening to receive the post such that the LEDs are disposed within the reflector and the heat sink is disposed externally (i.e., outside of the reflector in ambient air). Thermal energy generated by the LEDs is transferred through the post to the heat sink such that the junction temperature of the LEDs is lowered.

As may be appreciated, numerous reflector designs exist having a wide variety of different sized lamp openings. For example, the lamp openings may have different diameters and/or different thicknesses. As a result, an S8 wedge lamp/bulb designed for one type of reflector may not work with another reflector. This therefore significantly increases lamp manufacturing costs since numerous different lamps must be specifically designed for all the various reflectors. Additionally, the different types of S8 wedge lamps/bulbs sometimes lead to consumer confusion.

A lamp apparatus consistent with at least one embodiment of the present disclosure solves these problems. Specifically, a lamp apparatus consistent with at least one embodiment of the present disclosure features a novel grommet which provides adjustability such that a single lamp apparatus design may be retrofitted to a wide variety of different reflector designs. The grommet is flexible enough to allow the lamp apparatus to be secured to a variety of different sized and shaped openings in a reflector (e.g., a vehicle indicator light such as a tail light and/or brake light). For example, the grommet is flexible enough to collapse and to fit into small reflector lamp openings, yet large enough when expanded to fit in large reflector lamp openings. Additionally, the grommet is sufficiently rigid to securely mount the lamp apparatus within the reflector lamp opening. The grommet also seals the lamp apparatus to the reflector lamp opening to reduce and/or prevent debris (such as dirt, water, and the like) from entering the reflector cavity. As such, a single lamp apparatus consistent with the present disclosure may be used in a wide variety of reflectors, thereby reducing the overall manufacturing costs for the lamp apparatus and reducing or preventing consumer confusion.

Figure 1:
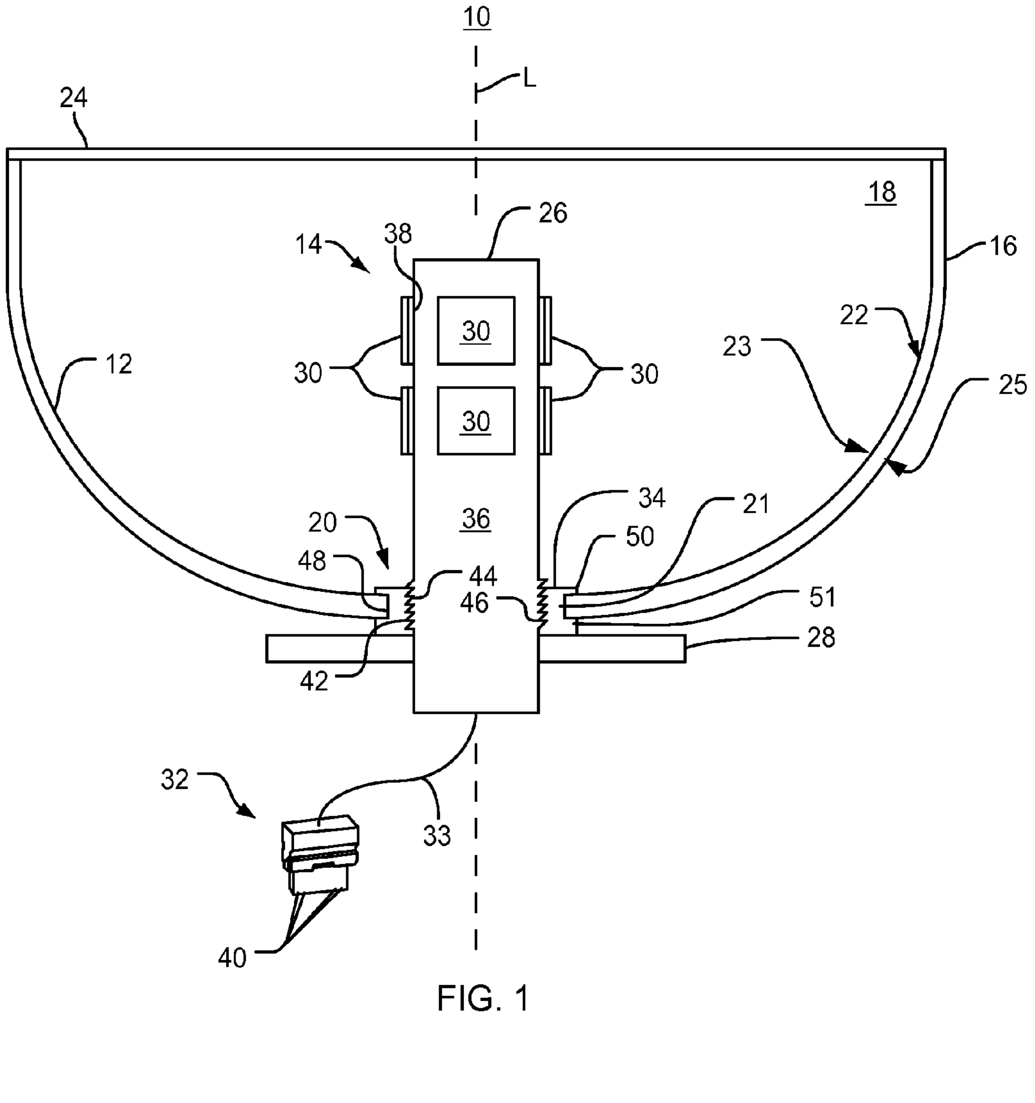
FIG. 1 illustrates one embodiment of cross-sectional view of a lighting system consistent with the present disclosure.

Referring to FIG. 1, a cross-sectional view of one embodiment of a lighting system 10 is illustrated. The lighting system 10 includes a reflector 12 and at least one lamp apparatus 14. The reflector 12 includes a body 16 defining an interior portion or cavity 18 and at least one opening 20 defining a rim 21 configured to receive the lamp apparatus 14. At least a portion of the cavity 18 includes one or more reflective surfaces 22 configured to emit light from the lamp apparatus 14 out of the cavity 18 in a light pattern. Optionally, the reflector 12 may include a lens, diffuser or the like 24 configured to protect the lamp apparatus 14 and/or seal the cavity 18. The lens 24 may also focus the light emitted from the lamp apparatus 14 in a desired light pattern. While not a limitation of the present disclosure unless specifically claimed as such, the lighting system 10 may include a vehicle indicator light as such a brake light and/or turn signal.

The lamp apparatus 14 includes a heat conductive post 26, a heat sink 28, at least one light engine 30, a connector 32, and a grommet 34. The heat conductive post 26 is configured to transfer thermal energy generated by the light engines 30 to the heat sink 28 as described herein. The heat conductive post 26 extends generally outwardly and away from the heat sink 28 and includes a plurality of faces or surfaces 36 having a longitudinal axes extending along a longitudinal axis (L) of the heat conductive post 26. For example, the heat conductive post 26 may include four faces 36 and may be generally rectangular. Alternatively, one or more of the faces 36 may taper (i.e., the plane of one or more of the faces 36 may intersect with the longitudinal axis L of the heat conductive post 26). For example, the heat conductive post 26 may have a generally pyramidal shape (though all of the faces 36 do not necessarily need to intersect at a single point). The base of the pyramid of the heat conductive post 26 may be proximate to or distal to the heat sink 28.

The heat conductive post 26 includes a material having a high thermal conductivity such as, but not limited to, a material having a thermal conductivity of 100 W/(m*K) or greater, for example, 200 W/(m*K) or greater. According to one embodiment, the heat conductive post 26 may include a metal or metal alloys (such as, but not limited to, aluminum, copper, silver, gold, or the like), plastics (e.g., but not limited to, doped plastics), as well as composites. The size, shape and/or configuration (e.g., surface area) of the heat conductive post 26 may depend upon a number of variables including, but not limited to, the maximum power rating of the light engines 30, the size/shape of the reflector 12 and the like.

Figure 2:
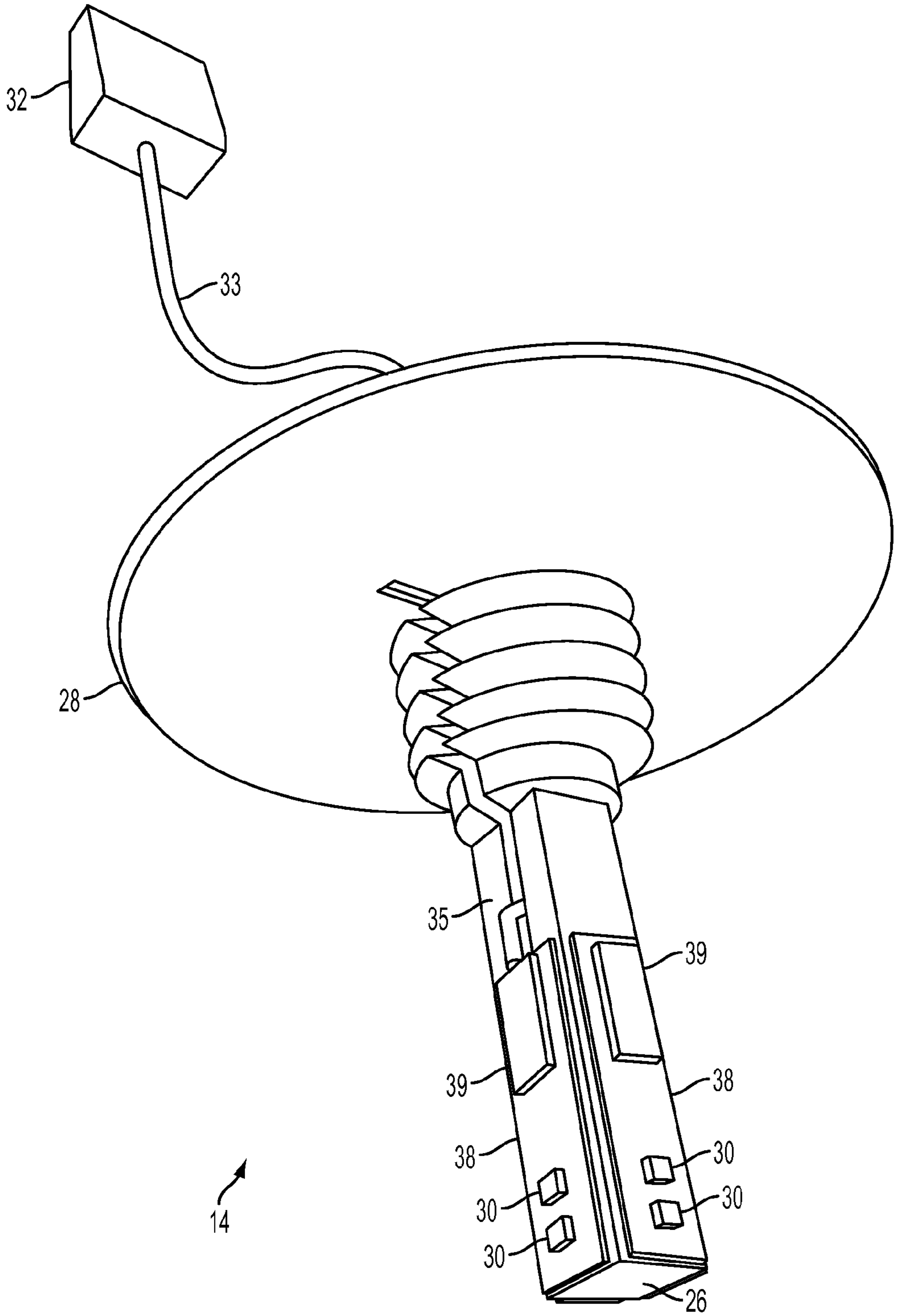
FIG. 2 illustrates a front view of one embodiment of a lamp apparatus consistent with the present disclosure.
Figure 3:
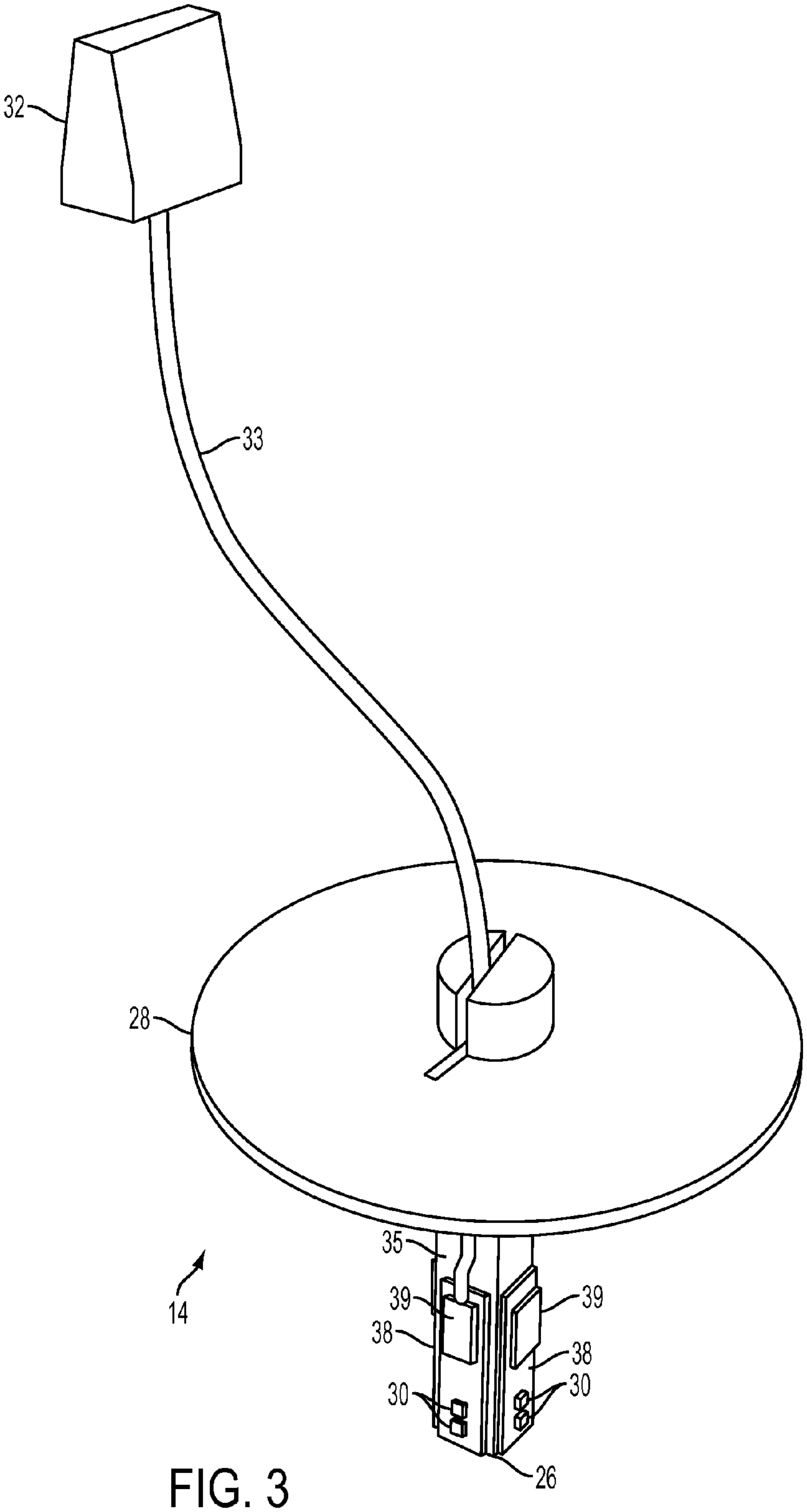
FIG. 3 illustrates a rear view of one embodiment of a lamp apparatus consistent with the present disclosure.

One or more of the faces 36 includes at least one light engine 30 mounted, coupled, or otherwise secured thereto. The light engines 30 are configured to emit light generally perpendicular to the longitudinal axis L of the heat conductive post 26. The light emitted from the light engines 30 is then reflected by the reflective surface(s) 22 of the reflector 12 out of the cavity 18 in the desired light pattern. It may be appreciated, however, that a portion or all of the light emitted from the light engines 30 may be emitted directly out of the cavity 18 (i.e., not reflected by the reflective surface(s) 22). For example, each face 36 may include two light engines 30, though the number and arrangement of the light engines 30 will depend on the intended application. Providing multiple light engines 30 in rows may allow the lamp apparatus 14 to cover multiple focal lengths, provide a 360 degree emission pattern, and make the emission pattern axially symmetric so that the rotation of the lamp apparatus 14 within the reflector 12 is irrelevant. The heat conductive post 26 may optionally include one or more grooves, slot, channels, or the like 35 (see, for example, FIGS. 2 and 3 which generally illustrate a front a rear perspective view of the lamp apparatus 14 without the grommet). The grooves 35 are configured to receive a wire, trace, or other electrical path for providing power to the light engines 30.

The light engines 30 may include any light source including, but not limited to, gas discharge light sources (such as, but not limited to, high intensity discharge lamps, fluorescent lamps, low pressure sodium lamps, metal halide lamps, high pressure sodium lamps, high pressure mercury-vapor lamps, neon lamps, and/or xenon flash lamps) as well as one or more solid-state light sources (e.g., but not limited to, semiconductor light-emitting diodes (LEDs), organic light-emitting diodes (OLED), or polymer light-emitting diodes (PLED), hereinafter collectively referred to as "LEDs 30"). The number, color, and/or arrangement of LEDs 30 may depend upon the intended application/performance of the lamp apparatus 14. The LEDs 30 may be coupled and/or mounted to a substrate (e.g., but not limited to, a ballast, PCB 38 or the like). The PCB 38 may comprise additional circuitry 39 including, but not limited to, resistors, capacitors, diodes, etc., which may be operatively coupled to the PCB 38 configured to drive or control (e.g., power) the LEDs 30 (i.e., driver circuitry). The additional circuitry 39 may also (or alternatively) include high load circuitry (e.g., one or more resistors configured to increase the overall resistance of the lamp apparatus 14 so that the lamp apparatus 14 is compatible with the minimum-current-for-flasher threshold associated with many vehicle bulb outage-detection systems). While the light engines 30 are illustrated as a single light source, one or more of the light engines 30 may include multiple light sources depending on the application.

According to one embodiment, the PCB 38 may be directly coupled to the heat conductive post 26. For example, a first surface of the PCB 38 may contact or abut against a surface 36 of the heat conductive post 26 to conduct thermal energy away from the LEDs 30. Optionally, one or more of the light engine 30 includes one or more thermal interface materials (e.g., gap pads, not shown for clarity) disposed between the PCB 38 and the heat conductive post 26 to decrease the contact thermal resistance between the PCB 38 (and LEDs 30) and the heat conductive post 26. The thermal interface material (not shown for clarity) may include outer surfaces which directly contact (e.g., abut against) surfaces of the PCB 38 and the heat conductive post 26, respectively. The thermal interface material may include a material having a higher thermal conductivity, k, configured to reduce the thermal resistance between the PCB 38 and the heat conductive post 26. For example, the thermal interface material may have a thermal conductivity, k, of 1.0 W/(m*K) or greater, 1.3 W/(m*K) or greater, 2.5 W/(m*K) or greater, 5.0 W/(m*K) or greater, 1.3-5.0 W/(m*K), 2.5-5.0 W/(m*K), or any value or range therein. The thermal interface material may include a deformable (e.g., a resiliently deformable) material configured to reduce and/or eliminate air pockets between the outer surfaces of the PCB 38 and the heat conductive post 26 to reduce contact resistance. The thermal interface material may have a high conformability to reduce interface resistance The interface material may have a thickness of from 0.010" to 0.250" when uncompressed. Optionally, one or more outer surfaces of the first thermal interface material may include an adhesive layer configured to secure the thermal interface material to the PCB 38 or the heat conductive post 26, respectively. The adhesive may be selected to facilitate thermal energy transfer (e.g., the adhesive may have a thermal conductivity k of 1 W/(m*K) or greater. Additionally (or alternatively), the PCB 38 and the heat conductive post 26 may be coupled (e.g., secured) together using one or more fasteners such as, but not limited to, screws, rivets, bolts, clamps, or the like. The thermal interface material may also be electrically non-conductive (i.e., an electrical insulator) and may include a dielectric material.

The heat sink 28 extends generally radially outwardly from the heat conductive post 26. The heat sink 28 is configured to transfer thermal energy generated by the light engines 30 and/or the driver circuitry 39 to ambient air. The heat sink 28 includes a material having a high thermal conductivity such as, but not limited to, a material having a thermal conductivity of 100 W/(m*K) or greater, for example, 200 W/(m*K) or greater. According to one embodiment, the heat sink 28 includes a metal or metal alloys (such as, but not limited to, aluminum, copper, silver, gold, or the like), plastics (e.g., but not limited to, doped plastics), as well as composites. The size, shape and/or configuration (e.g., surface area) of the heat sink 28 will depend upon a number of variables including, but not limited to, the maximum power rating of the light engines 30, the size/shape of the reflector 12 and the like. As shown, the heat sink 28 has a generally circular or disc shape, however, the heat sink 28 may have any size or shape depending on the intended application. According to one embodiment, the heat sink 28 and the heat conductive post 26 are a single, unitary (i.e., integral) component. Alternatively, the heat sink 28 and the heat conductive post 26 are two separate components that are secured to each other (e.g., using an adhesive, fastener, clamp, friction coupling, or the like. Optionally, the heat sink 28 is anodized, coated, or the like to prevent and/or reduce corrosion.

As illustrated in FIG. 1, the heat sink 28 is outside of the reflector 12 (i.e., outside of the cavity 18) when the lamp apparatus 14 is installed in the reflector 12. As such, the heat sink 28 is exposed to cooler, ambient air compared to the air within the reflector 12 (i.e., within the cavity 18). The heat sink 28 therefore transfers more thermal energy away from the light engines 30, resulting in a lower junction temperature for the light engines 30.

The connector 32 is configured to provide power to the light engines 30 when electrically coupled to a power source (e.g., a lamp socket). The connector 32 includes a plurality of electrical conductors 40 electrically coupled to the light engines 30. Optionally, the connector 32 is configured to align and electrically couple the electrical conductors 40 with a lamp socket. The connector 32 may have any shape and/or configuration depending on the intended application. As shown, the connector 32 includes a wedge connector configured to mechanically couple with a wedge-based lamp socket such as, but not limited to, a S8 wedge connector configured to mechanically couple with a S8 wedge lamp socket. The connector 32 is electrically coupled to the light engines 30 and/or driver circuitry 39 by way of one or more electrical cables (e.g., wires, traces, or the like) 33. The electrical cable 33 may include a flexible cable depending upon the intended application. For example, the electrical cable 33 may include a flexible cable which is readily displaceable under light manual force. The use of a flexible electrical cable 33 which is readily displaceable under light manual force allows the lamp apparatus 14 to be compatible with a wide variety of lighting systems 10, thereby reducing potential consumer confusion and/or reducing manufacturing costs. More specifically, flexible electrical cable 33 allows connector 32 to be moved relative to heat conductive post 26 (and the rest of the light apparatus 14) under application of light manual force thereby providing a greater degree of freedom when making the connection between connector 32 and the lamp socket (not shown). As may be appreciated, flexible cable 33 may be secured (e.g., but not limited to, using of zip-ties or the like) within the operating environment (i.e., automotive light) to reduce/prevent vibration and/or noise. In contrast, the electrical cable 33 may also include a hard-wired, rigid connection between the light engines 30 and/or driver circuitry 39 and the connector 32 (i.e., the position of the connector 32 may be fixed relative to the rest of the lamp apparatus 14). The use of an S8 wedge connector may eliminate the need to modify the existing socket when retrofitting the lamp apparatus 14 into an existing S8 socket. While an S8 wedge connector is illustrated, the connector 32 may include any connector design known to those skilled in the art such as, but not limited to, screw connector, double contact bayonet bases, a bipin base, or the like.

The grommet 34 is configured to secure the lamp apparatus 14 within the opening 20 of the reflector 12. According to one embodiment, the grommet 34 is configured to allow the lamp apparatus 14 to be secured within openings 20 having a variety of different sizes and/or shapes. The grommet 34 includes a resiliently deformable material such as, but limited to, rubber or the like. For example, the grommet 34 is flexible enough to collapse to fit into small reflector lamp openings 20, yet large enough when expanded to fit in large reflector lamp openings 20. Additionally, the grommet 34 is sufficiently rigid to securely mount the lamp apparatus 14 within the reflector lamp opening 20. According to one embodiment, the grommet 34 has a hardness of 60-70 on the Shore A durometer scale. The grommet 34 also seals the lamp apparatus 14 to the reflector lamp opening 20 to reduce and/or prevent debris (such as dirt, water, and the like) from entering the reflector cavity 18. As such, a single lamp apparatus 14 consistent with the present disclosure may be used in a wide variety of different sized/shaped reflectors 12, thereby reducing the overall manufacturing costs for the lamp apparatus 14 and reducing or preventing consumer confusion.

Figure 4:
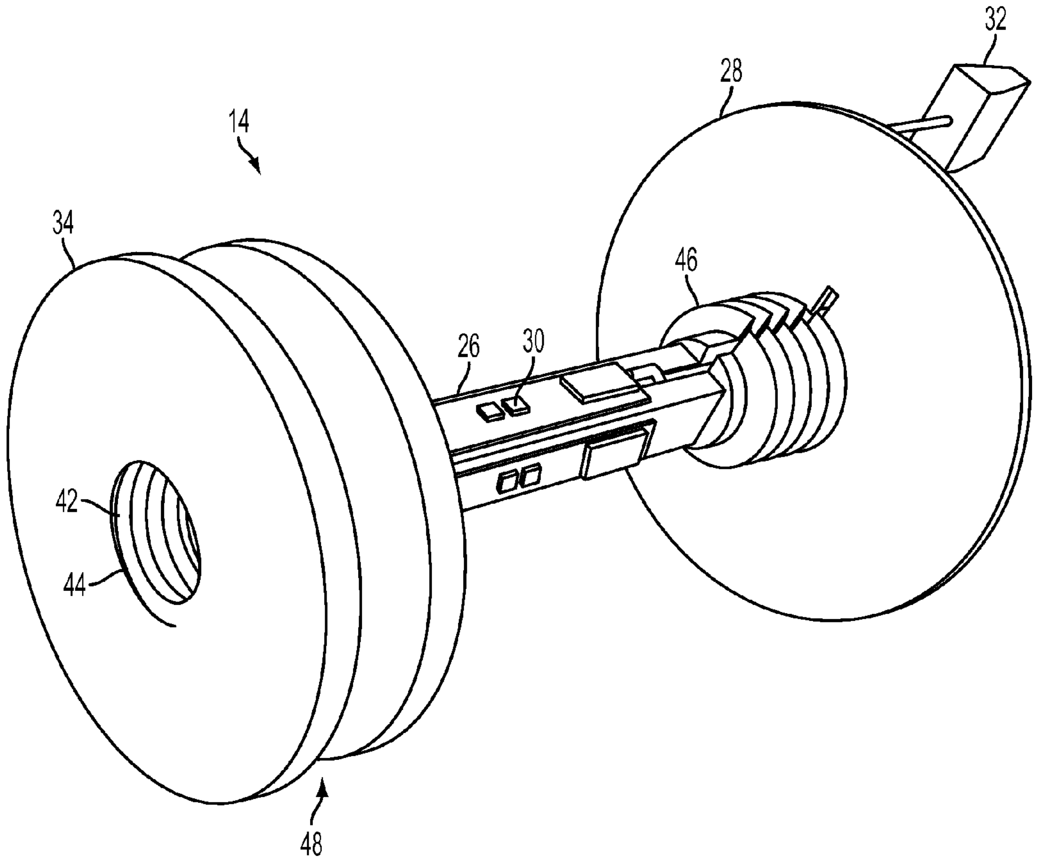
FIG. 4 illustrates another front view of a lamp apparatus consistent with the present disclosure.
Figure 5:
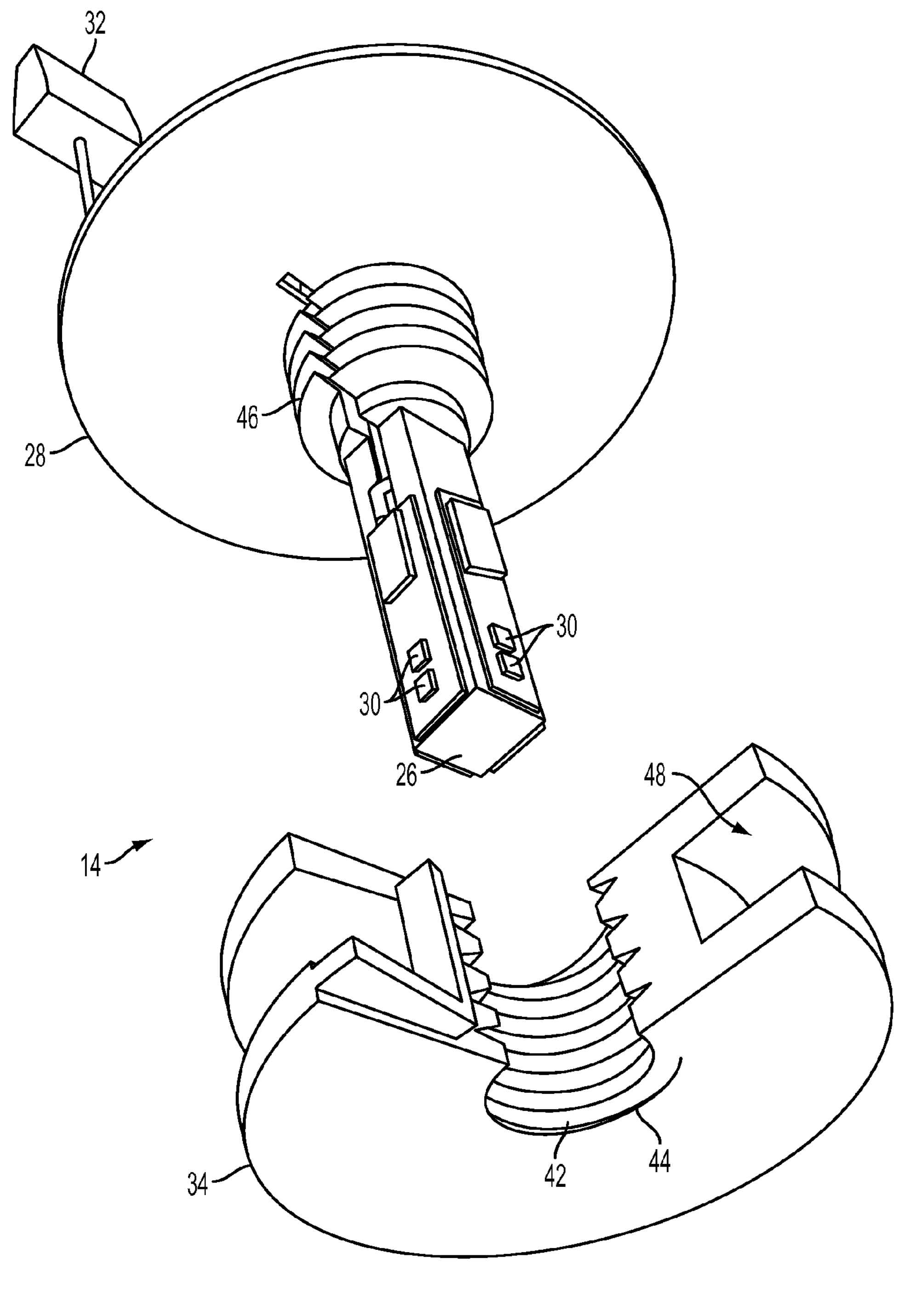
FIG. 5 illustrates a further view of a lamp apparatus consistent with the present disclosure.

The grommet 34 includes an opening 42 configured to receive a portion of the heat conductive post 26, for example, proximate to the heat sink 28 and the grommet 34 is configured to be secured to the heat conductive post 26. For example, the grommet 34 includes a threaded portion 44 configured to engage a threaded portion 46 associated with the heat conductive post 26 (see, for example, FIGS. 4 and 5). Alternatively (or in addition), the opening 42 of the grommet 34 may not be threaded and the threaded portion 46 of the heat conductive post 26 may be self-tapping. According to yet another embodiment, the heat conductive post 26 may include a radial groove or slot 56 (see, for example, FIG. 8) configured to receive at least a portion of the opening 42 of the grommet 34. Grommet 34 may also be secured to heat conductive post 26 with an adhesive, clamp, fastener (e.g., the threaded connection described herein), or the like.

Optionally, the grommet 34 includes a radial groove 48 (see, for example, FIGS. 1, 4, 5, 6A, and 6B). With reference specifically to FIG. 1, the radial groove 48 is configured to receive at least a portion of the rim 21 of the opening 20 in the reflector 12 such that a first and second portion 50, 51 portion of the grommet 34 extends on the inner surface 23 (i.e., within the cavity 18) and the outer surface 25 of the reflector 12. The grommet 34 is flexible enough to collapse and be pushed through the opening 20 in the reflector 12 without damaging the reflector 12, yet stiff enough to hold/secure the lighting system 10 within the opening 20 of the reflector 12.

Figure 6A:
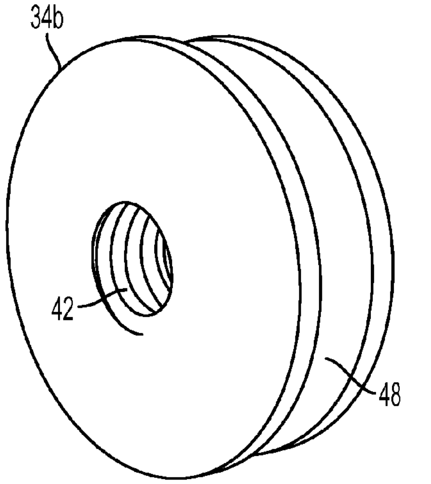
FIGS. 6A-6C illustrate various views of another embodiment of a grommet consistent with the present disclosure.
Figure 6B:
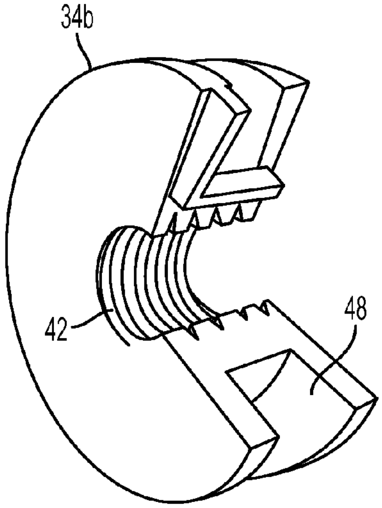
Figure 6C:
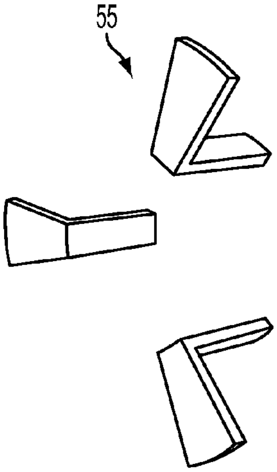

Turning now to FIGS. 6A-6C, another embodiment of a grommet 34*b* consistent with the present disclosure is generally illustrated. In particular, the grommet 34*b* includes one or more stiffeners 55. The stiffeners 55 are configured to increase the overall stiffness and/or rigidity of the grommet 34*b*. The increased stiffness or rigidity of the grommet 34*b* may increase the ability of the grommet 34*b* to secure the lamp apparatus 14 within larger diameter openings 20 in the reflector 12 and/or to minimize movement (e.g., vibration) of the lamp apparatus 14 within the reflector 12. The size and shape of the stiffeners 55 will depend on the intended application. According to one embodiment, the stiffeners 55 has a "L" shaped cross-section in which a portion extends within the grommet 34*b* along the height of the grommet 34*b* and another portion extends radially outwardly within the grommet 34*b*. The stiffeners 55 may include plastic and/or metal inserts, which may be molded within the grommet 34*b*. Alternatively (or in addition), the stiffeners 55 may be inserted into grommet 34*b*, for example, within slits formed in the grommet 34*b*. The size and/or shape of the stiffeners 55 will depend upon the intended application.

For example, one embodiment of lamp apparatus 14 of the present disclosure includes a rectangular heat conductive post 26 having a width of 5-6 mm and an overall length of 40 mm. Threaded portion 46 of heat post 26 has a height of 11.5 mm and a diameter of 12 mm. Heat sink 28 has a diameter of 40 mm and a thickness of 1 mm. Grommet 34 has an overall diameter of 30 mm, an overall height of 9 mm, opening 42 has a diameter of 8-12 mm, and the radial groove has a height of 5 mm and extends 6 mm from the outer edge towards opening 42. Lamp apparatus 14 optionally includes stiffeners 55 having an "L" shaped cross-section with a thickness of 1 mm in which a portion of stiffeners 55 have height of 8.5 mm and extend radially outwardly 8 mm along a radius of 20 degrees. It is understood that this is merely an example, and that lamp apparatus 14 may have other dimensions depending on the intended application.

Figure 7:
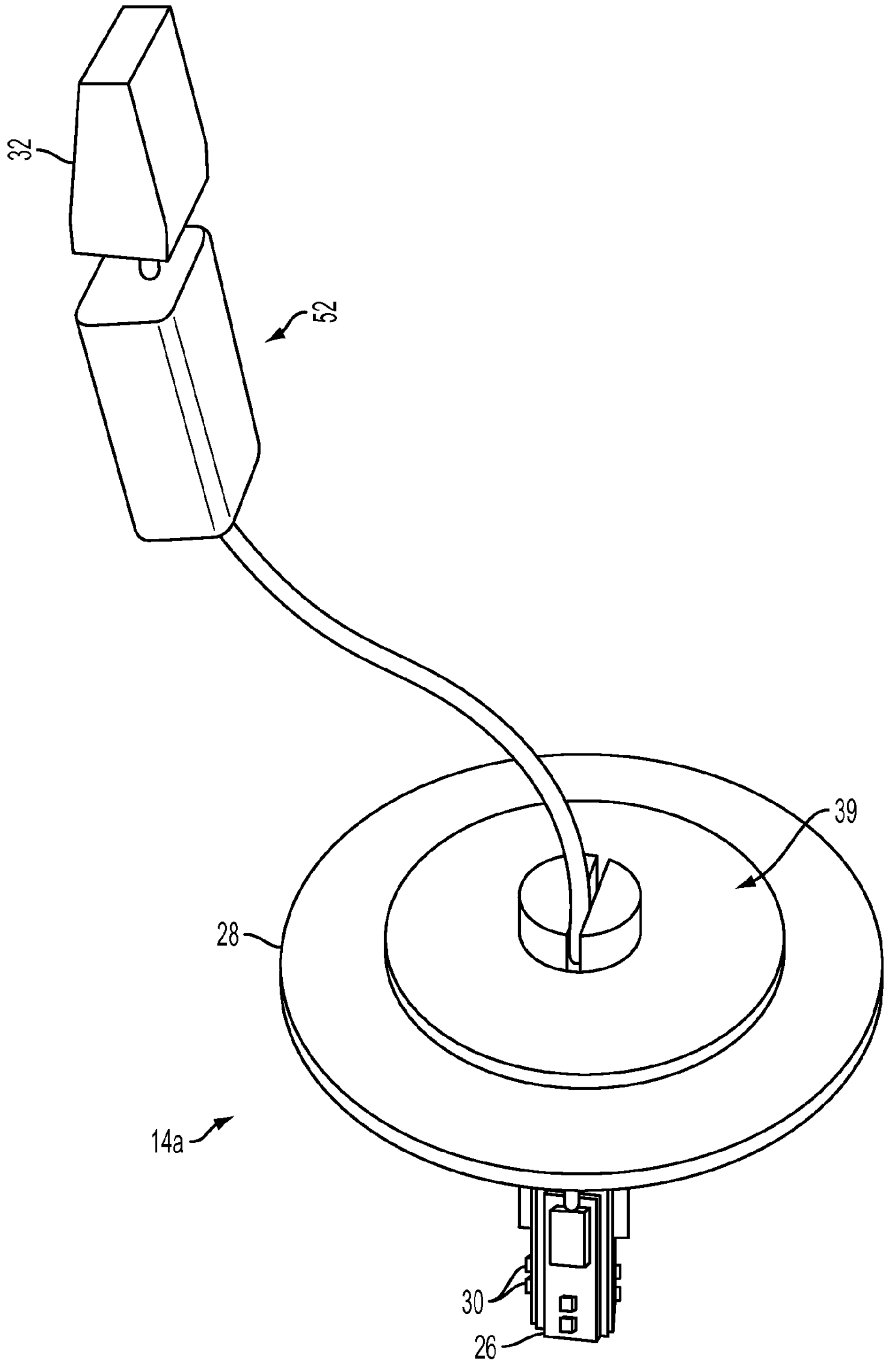
FIG. 7 illustrates a rear view of another embodiment of a lamp apparatus consistent with the present disclosure.

Turning now to FIG. 7, another embodiment of a lamp apparatus 14*a* is generally illustrated. Rather than coupling driver circuitry 39 to heat conductive post 26, driver circuitry 39 is coupled to the backside of the heat sink 28. Coupling the driver circuitry 39 directly to the heat sink 28 (as opposed to the heat conductive post 26) may further reduce the junction temperature of the light engines 30 by minimizing the amount of thermal energy that needs to be transferred by the heat conductive post 26. Additionally, the size of heat conductive post 26 may be reduced and/or the number and arrangement of light engines 30 may be optimized.

Rather than integrating the high-load circuitry into the PCB 39, lamp apparatus 14*a* may additionally (or alternatively) include an external high load circuitry 52. As described herein, the overall resistance of the lamp apparatus 14*a* may need to be increased so that the lamp apparatus 14*a* is compatible with the minimum-current-for-flasher threshold associated with many vehicle bulb outage-detection systems. The external high load circuitry 52 may be disposed between the heat sink 28 and the connector 32, for example, proximate to the connector 32. Coupling external high load circuitry 52 between heat sink 28 and connector 32 may further reduce the junction temperature of light engines 30 by minimizing the amount of thermal energy that needs to be transferred by heat conductive post 26. Additionally, the size of heat conductive post 26 may be reduced and/or the number and arrangement of light engines 30 may be optimized.

Figure 8:
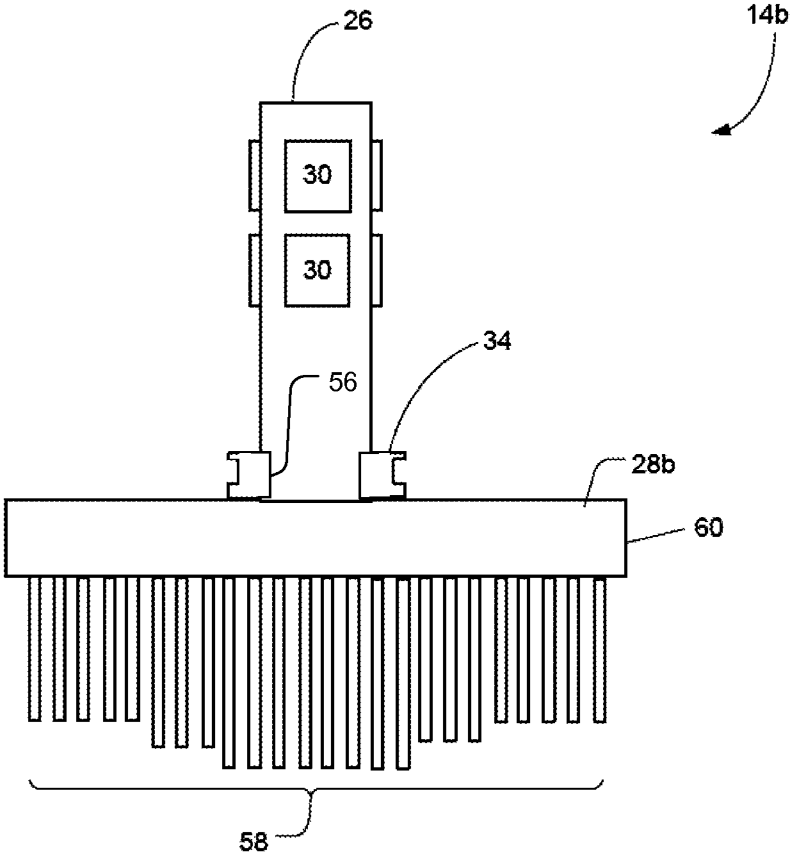
FIG. 8 illustrates a side view of yet another embodiment of a lamp apparatus consistent with the present disclosure.

With reference to FIG. 8, another embodiment of a lamp apparatus 14*b* consistent with the present disclosure is generally illustrated. Lamp apparatus 14*b* may include heat sink 28*b* having a plurality of fins 58 extending outwardly from base 60. The fins 58 may include straight and/or flared pins or fins. Additionally, the heat conductive post 26 is illustrated with a radial slot 56 into which a portion of the grommet 34 expands to secure the grommet 34 to the post 26. The conductive heat post 26 is also illustrated not extending through the base of the heat sink 28.

Figure 9:
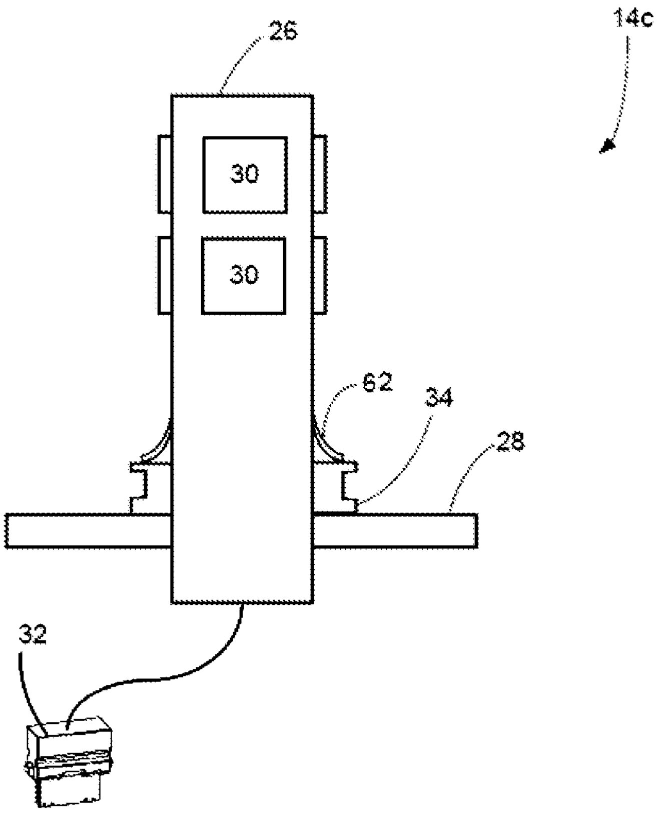
FIG. 9 illustrates a side view of yet a further embodiment of a lamp apparatus consistent with the present disclosure.

Turning now to FIG. 9, yet another embodiment of a lamp apparatus 14*c* consistent with the present disclosure is generally illustrated. The lamp apparatus 14*c* include a grommet 34 which is secured using a biasing fastener 62. The biasing fastener 62 may include a resilient tab or latch which is configured to compress as the grommet is advanced towards the heat sink 28. Once the grommet 34 passes the biasing fastener 62, the tabs or latches expand outwardly and secure the grommet 34 against the heat sink 28.

Figure 10:
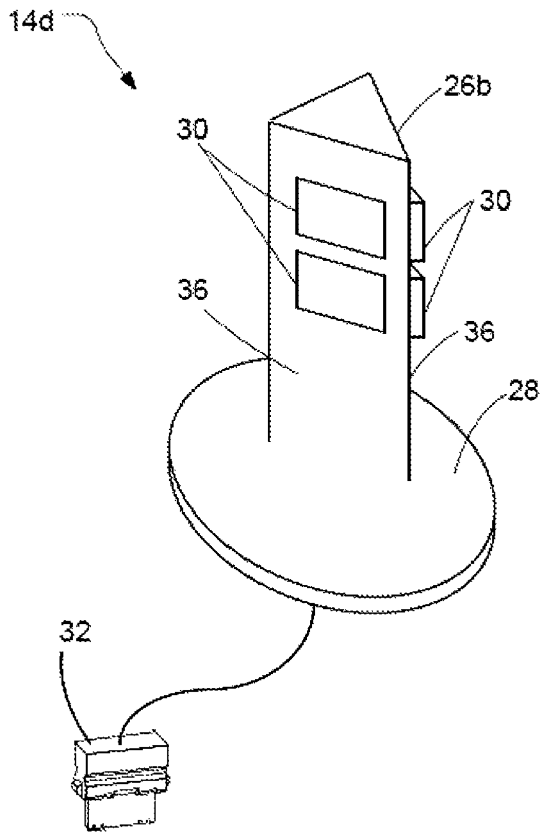
FIG. 10 illustrates an end view of yet another embodiment of a lamp apparatus consistent with the present disclosure.

FIG. 10 illustrates another embodiment of a lamp apparatus 14*d* consistent with the present disclosure. The lamp apparatus 14*d* includes a conductive heat post 26*b* having a generally triangular cross-section. The sides or faces 36 of the conductive heat post 26*b* each include one or more light engines 30.

In any embodiment described herein, the high load circuitry may include static or dynamic high load circuitry configured to mimic the higher load of an incandescent bulb (e.g., about 10-20 Watts). The static high load circuitry may be used with a vehicle flasher system and may include a resistor parallel to the light engines. For illustrative purposes only, the resistor may be about 15 Ohms. A benefit of the static high load circuitry is that it is inexpensive. The dynamic high load circuitry may include a resistor and a delay circuit, which turns the load off after about a few seconds of continuous on-time. The load will be active (i.e., illuminated) during the turn signal function because the load is only on for less than a second. In brake mode, the load is active for a few seconds, and then shuts off since the load is not required in brake mode. A benefit of the dynamic high load circuitry is that it saves energy and reduces the average heat load.

To retrofit a lamp apparatus consistent with the present disclosure to an existing reflector having an incandescent bulb, the original incandescent S8 bulb is removed is disconnected from the S8 wedge socket and removed from opening 20 of reflector 12. Grommet 34 of the present disclosure is inserted into reflector opening 20, for example, such that a portion of the grommet 34 is disposed on the inside and outside of the reflector 12 opening 40. The grommet 34 is big enough and flexible enough to cover a variety of opening diameters. The heat conductive post 26 and light engines 30 are inserted into the opening 42 in the grommet 34 and secured thereto (e.g., using a fastener such as, but not limited to, the threaded connection 44, 46 described herein). Connector 32 is also electrically coupled to the corresponding S8 wedge socket.

The heat conductive post 26 is preferably as small as possible to get a small optical source and better coupling to the reflector 12, however, the heat conductive post 26 should be large enough to conduct enough thermal energy from the light engines 30 to the heat sink 28 such that the junction temperature of the light engines 30 is within the acceptable operating range. The heat conductive post 26 should also be at least as wide as the light engines 30.

By way of example, a lamp apparatus 14 consistent with the present disclosure may include eight LEDs, e.g., Osram advanced power TopLED (APT) at 0.4 W each for a total of 3.2 W. Heat conductive post 26 may be 5 mm by 5 mm by 30 mm long. Heat conductive post 26, when made from copper, may have a thermal resistance of 3K/W and, when made from aluminum, may have a thermal resistance of 6K/W. As such, the temperature difference between heat sink 28 and the LEDs may be about 9.6 C or 19.2 C. The LEDs may be placed on metal core PCB 38 for best thermal performance, and PCBs 38 may be screwed into heat conductive post 26. Wires connect PCBs 38 and two wires go through groove 35 to heat sink 28 to the driver. In order to minimize cost, a resistive driver may be used. The resistors may be on the metal PCB 38 with the LEDs or on a separate driver board near the heat sink 28. The LEDs are connected in two strings of four LEDs and two resistors in each string so that each PCB 38 has two LEDs and one resistor on it. The resistors may be 14 Ohms and 1

Watt each. Two regular silicone diodes and one more resistor may be used to provide a two-function (e.g., brake and tail) device.

The lamp apparatus of the present disclosure in one aspect includes a heat conductive post, a heat sink, a plurality of light engines, a connector and a grommet. The heat conductive post extends generally outwardly and away from the heat sink and includes a plurality of faces extending along a longitudinal axis of the post. At least one light engine is coupled to each of the plurality of faces. The connector is configured to provide power to the light engines when electrically coupled to a lamp socket. The grommet is configured to be secured to and extend generally around a perimeter of the post proximate to the heat sink. The grommet comprises a radial groove configured to receive a rim of an opening of a reflector such that a first and a second portion of the grommet extend beyond the rim and over a portion of an interior and an exterior surface of the reflector to secure the lamp apparatus to the opening of the reflector.

The terms "first," "second," "third," and the like herein do not denote any order or quantity, but rather distinguish one element from another, and the terms "a" and "an" herein do not denote a limitation of quantity, but rather the presence of at least one of the referenced item.

While the principles of the present disclosure are described herein, those skilled in the art understand that this description is exemplary and not limiting to the scope thereof. The features described with reference to particular embodiments disclosed are susceptible to combination with other embodiments described herein. Such combinations of described features to such other embodiments are contemplated herein. Other embodiments are contemplated within the scope of the present disclosure in addition to the exemplary embodiments described herein. Modifications and substitutions by one of ordinary skill in the art are considered to be within the scope thereof.

The following is a non-limiting list of reference numeral used in the specification:

10 lighting system
12 reflector
14 lamp apparatus
16 body
18 interior portion/cavity
20 opening
21 rim
22 reflective surface
23 inner surface
24 lens/diffuser
25 outer surface
26 heat conductive post
28 heat sink
30 light engine
32 connector
33 flexible cable
34 grommet
35 grooves
36 plurality of faces
38 PCB
39 driver circuitry
40 plurality of electrical conductors
42 grommet opening
44, 46 threaded portion
48 radial groove
50 first portion of grommet
51 second portion of grommet
52 high load circuitry
55 stiffeners
56 radial slot
58 fins
60 base
62 biasing fastener
L longitudinal axis

What is claimed is:

1. A lamp apparatus (14) comprising:
a heat sink (28);
a heat conductive post (26) extending generally outwardly and away from a first surface of said heat sink (28), said heat conductive post (26) having a plurality of faces (36) extending along a longitudinal axis (L) of said post (26);
at least one light engine (30) coupled to each of said plurality of faces (36);
a connector (32) configured to provide power to said light engine (30) when electrically coupled to a lamp socket; and
a grommet (34) configured to be secured to and extend generally around a perimeter of said heat conductive post (26) proximate to said heat sink (28), said grommet (34) comprising a radial groove (48) configured to receive a rim (21) of an opening (20) of a reflector (12) such that a first portion and a second portion (50, 51) of said grommet (34) extend beyond said rim (21) and over a portion of an interior and an exterior surface (23, 25) of said reflector (12) to generally secure said lamp apparatus (14) to said opening (20) of said reflector (12), and
wherein said heat conductive post (26) is formed connected to said heat sink (28) such that the heat conductive post (26) and the heat sink (28) of said lamp apparatus (14) are together as a unit selectively connectable to, and removable from, a vehicle chassis when said lamp apparatus (14) is connected to or removed from the vehicle chassis.

2. The lamp of claim 1, further comprising at least one flexible cable (33) electrically coupled between said light engine (30) and said connector (32), wherein said connector (32) is readily displaceable relative said post (26).

3. The lamp of claim 1, wherein connector (32) comprises a wedge connector configured to mechanically couple with a wedge-based lamp socket.

4. The lamp of claim 1, wherein said heat conductive post (26) further comprises a radial slot (56) into which a portion of said grommet (34) expands to secure said grommet (34) to said heat conductive post (26).

5. The lamp of claim 1, wherein said grommet (34) is secured to said heat conductive post (26) using an adhesive.

6. The lamp of claim 1, wherein said grommet (34) has a hardness of 60-70 on the Shore A durometer scale.

7. The lamp of claim 1, wherein a portion of said heat conductive post (26) extends outwardly and away from a second surface of said heat sink (28), said second surface of said heat sink (28) being generally opposite from said first surface.

8. The lamp of claim 1, wherein said post (26) comprises a fastener configured to couple said grommet (34) to said post (26).

9. The lamp of claim 8, wherein said fastener comprises threaded portion (46) configured to engage an opening (42) in said grommet (34).

10. The lamp of claim 9, wherein said grommet (34) comprises a threaded portion (44) configured to engage said threaded portion (46) of said post (26).

11. The lamp of claim 9, wherein said threaded portion (46) of said fastener comprises a self-tapping thread configured to engage said opening (42) in said grommet (34).

12. The lamp of claim 1, further comprising driver circuitry (39) mounted on said heat sink (28).

13. The lamp of claim 1, wherein only said grommet (34) secures said lamp apparatus (14) to said opening (20) of said reflector (12).

14. The lamp of claim 1, wherein said grommet (34) further comprises stiffeners (55) molded into said grommet (34) to increase the stiffness of said grommet (34) when said grommet (34) is disposed within said opening (20).

15. The lamp of claim 1, in combination with a reflector (12), said reflector (12) comprising said opening (20), an interior surface (23), and an exterior surface (25), wherein at least a portion of said interior surface (23) is configured to reflect light generally away from said reflector (12).

16. The lamp of claim 1, wherein said grommet (34) is made of a resiliently deformable material.

17. The lamp of claim 1, wherein said heat conductive post (26) and said heat sink (28) are formed as a single component.

18. The lamp of claim 1, wherein said heat conductive post (26) is formed as a separate piece from said heat sink (28) and is secured thereto.

19. A lamp apparatus (14) comprising:

a heat sink (28);

a heat conductive post (26) extending generally outwardly and away from a first surface of said heat sink (28), said heat conductive post (26) having a plurality of faces (36) extending along a longitudinal axis (L) of said post (26);

at least one light engine (30) coupled to each of said plurality of faces (36);

a connector (32) configured to provide power to said light engine (30) when electrically coupled to a lamp socket; and a grommet (34) configured to be secured to and extend generally around a perimeter of said heat conductive post (26) proximate to said heat sink (28), said grommet (34) comprising a radial groove (48) configured to receive a rim (21) of an opening (20) of a reflector (12) such that a first portion and a second portion (50, 51) of said grommet (34) extend beyond said rim (21) and over a portion of an interior and an exterior surface (23, 25) of said reflector (12) to generally secure said lamp apparatus (14) to said opening (20) of said reflector (12), wherein said heat conductive post (26) further comprises a radial slot (56) into which a portion of said grommet (34) expands to secure said grommet (34) to said heat conductive post (26).

* * * * *